United States Patent [19]

Hintz et al.

[11] Patent Number: 5,222,235
[45] Date of Patent: Jun. 22, 1993

[54] DATABASES SYSTEM FOR PERMITTING CONCURRENT INDEXING AND RELOADING OF DATA BY EARLY SIMULATING THE RELOAD PROCESS TO DETERMINE FINAL LOCATIONS OF THE DATA

[75] Inventors: Thomas E. Hintz; William R. Cunningham, both of Austin, Tex.

[73] Assignee: BMC Software, Inc., Sugar Land, Tex.

[21] Appl. No.: 473,663

[22] Filed: Feb. 1, 1990

[51] Int. Cl.⁵ .................. G06F 3/00; G06F 7/00; G06F 9/38
[52] U.S. Cl. .................. 395/600; 364/283.1; 364/974; 364/264.3; 364/DIG. 1; 395/500; 395/800
[58] Field of Search .......... 395/500, 600, 800

[56] References Cited

U.S. PATENT DOCUMENTS

| 4,247,892 | 1/1981 | Laurence et al. | 364/200 |
|---|---|---|---|
| 4,514,826 | 4/1985 | Iwata et al. | 364/900 |
| 4,575,798 | 3/1986 | Lindstrom et al. | 364/300 |
| 4,644,471 | 2/1987 | Kojima et al. | 395/600 |
| 4,679,139 | 7/1987 | Durbin | 395/425 |
| 4,714,992 | 12/1987 | Gladney et al. | 364/200 |
| 4,819,156 | 5/1989 | DeLorme et al. | 364/200 |
| 4,831,515 | 5/1989 | Kamada et al. | 364/200 |
| 5,053,945 | 10/1991 | Whisler | 364/239.6 |
| 5,060,147 | 10/1991 | Mattheyses | 395/650 |

*Primary Examiner*—Thomas C. Lee
*Assistant Examiner*—Meng-Ai T. An
*Attorney, Agent, or Firm*—Arnold, White & Durkee

[57] ABSTRACT

The reorganization method of DB2 data files explores parallel processing, and asynchronous I/O to a great extent. It includes means to estimate an optimum configuration of system resources, such as storage devices (DASD devices), memory, and CPUs, etc, during reorganizations. The method mainly consists of four components, (1) concurrent indexing, (2) concurrent unloading of data file partitions, (3) efficient reloading of DB2 data pages and DB2 space maps, and (4) means to reduce access constraints to the DB2 recovery table.

1 Claim, 7 Drawing Sheets

FIGURE 1

|  | LAST NAME<br>[Field 1] | FIRST<br>NAME<br>[Field 2] | MIDDLE<br>INITIAL<br>[Field 3] | COMPANY<br>[Field 4] |
|---|---|---|---|---|
| Record 1 | Hintz | Tom |  | BMC Software |
| Record 2 | Cunningham | Bill |  | BMC Software |
| Record 3 |  |  |  |  |

•  •
•  •
•  •

| Record n | | | | |

ACTUAL LOADING LAYOUT (CONTIGOUS DATA STREAMS)

DESIRED LOADING LAYOUT

DATABASES SYSTEM FOR PERMITTING CONCURRENT INDEXING AND RELOADING OF DATA BY EARLY SIMULATING THE RELOAD PROCESS TO DETERMINE FINAL LOCATIONS OF THE DATA

TABLE OF CONTENTS

1. BACKGROUND OF THE INVENTION
   1.1 Databases
   1.2 Database Indexes
   1.3 Database Disorganization
   1.4 Overview of DB2 REORG and its Related Environments
   1.5 Multitasking and Multiprocessor Environments
   1.6 DB2 Tables
   1.7 DB2 Indexes
   1.8 DB2 I/O
   1.9 The DB2 Catalog Table
   1.10 Internal Operation of DB2 REORG
   1.11 Problems with DB2 REORG
2. SUMMARY OF THE INVENTION
   2.1 Overview of the Improved Reorganization Method
   2.2 Concurrent Indexing
   2.3 I/O Efficiency
   2.4 Updates of the Recovery Table
   2.5 Concurrent Unloading of Partitions
3. BRIEF DESCRIPTION OF THE DRAWINGS
4. DETAILED DESCRIPTION OF SPECIFIC EMBODIMENTS
   4.1 Pseudo Code Appendices
   4.2 The UNLOAD Routine
   4.3 The LOAD BALANCING Routine
   4.4 The INITIALIZATION Routine
   4.5 The ACTIVE TASKS Routine
   4.6 The MAXIMUM TASKS Routine
   4.7 The TEST TASKS Routine
   4.8 PARTITION UNLOAD Routine
   4.9 The SORT TEST Routine
   4.10 The VERIFY SORT SPACE Routine
   4.11 The CALCULATE MEMORY Routine
   4.12 The RELOAD WITH CONCURRENT INDEXING Routine
   4.13 The BUILD Routine
   4.14 RELOAD I/O Routine
   4.15 The SPACE MAP SHIFT Routine
5. CONCLUSION
   APPENDICES A through O
6. CLAIMS

1. BACKGROUND OF THE INVENTION

The present invention relates to a method for efficiently reorganizing databases that are stored in a computer system.

1.1 Databases

As illustrated in FIG. 1, a database file typically includes "records" that are divided into "fields". A record in a database file may be thought of as a row in a table, containing, for example, all the information for a client. Fields may be thought of as columns in a table. For example, one field in a database may correspond to the name of a client, another field of the same record may correspond to the client's company.

Fields commonly have specific sizes that are determined when the database file is constructed. For example, a field containing dates may have two character positions each for the day and for the month, and four character positions for the year (a character position corresponds to a letter of text, numerical digit or punctuations etc.). Variable size fields may also be implemented in the database. These fields may acquire additional character positions as required. For example, a field containing comments about a client may contain a short phrase or a complete paragraph of text.

Records in a database may be rearranged into a desired order, by sorting, whereas fields are fixed with respect to the record. Hence, the fields are common to the database, even though the field contents are not.

It is often desired to be able to retrieve information quickly from the database. If a database is randomly organized, in no specific order, it may be necessary to check all data, in "linear search" to find the desired information.

If the data in a database are organized on a specific field, for example, on the name of a client, it is necessary to search only a small portion of the database to find the desired client. This corresponds to the normal use of, e.g., a dictionary or telephone directory. One possible approach to perform a search would be to divide the directory into two equal halves, and then determine which half contains the desired information. The half that does not contain the information is excluded, and the remaining half is again divided into two equally sized portions. The process continues until the information is found. This process might seem slow, but an item in a list of a thousand items will be located with ten or fewer process steps. Many computers perform a searches as described above.

1.2 Database Indexes

Most databases contain "support" files, in addition to the data files (data files store the actual information that is of interest to the user or his clients etc.). The "support" files may include "index" files. An index file works like the index in a book; it contains a key (corresponds to a word or phrase in the index of the book) and a pointer (corresponds to the page number in the index of the book).

for more efficient access to the data, indexes are used. Indexes are nothing more than an ordered set of key/pointer pairs stored in a separate file. The key is composed of one or more columns and the pointer identifies where to find the associated data row in the data file. Like the data file, the index file is made up of pages. Non-leaf pages contain information to access leaf pages and leaf pages contain the key/pointer pairs for accessing the data rows.

An index file typically contains "key/pointer" pairs that are related to a few fields in the database (i.e. a database may be arranged according to client names and telephone numbers). Each pointer is associated with a key, i.e., a copy of a data field from the original database. The pointer keeps track of where the associated record is stored in the data base. Naturally the index file has to be sorted when information is added or removed from the database, but the index file is much smaller than the database and is therefore quicker to sort. Furthermore, the organization of an index file may be based on a pointer structure (e.g., the well-known B-tree or B-plus tree organization).

1.3 Database Disorganization

The continual insertion, deletion, and updating of databases, IBM's DATABASE 2 (DB2) for mainframe computers in particular, causes data in the database to become disorganized. Disorganization can take the form of fragmented free space, data indirection, out-of-order data, and out-of-order index pages.

Fragmented free space is caused by repeated insertions and deletions of data rows such that some or all of the deleted space is not or cannot be used. This wasted space may cause files to grow unnecessarily large.

Data indirection is caused by updating a data row such that it no longer fits on the same page. In this case, a pointer is left on the original page that points to a new page containing the updated row. Data indirection always causes one additional I/O operation.

Out-of-order data is caused by repeated insertions such that the data rows are not in key sequence as defined by one of the indexes. This causes non-sequential and possibly random I/O to the data file when accessing large portions of data through the index.

Out-of-order index pages is caused by repeated insertions. The leaf pages containing successive key values are not adjacent to each other, causing non-sequential and possibly random I/O operations to the index file.

In general, disorganization causes more file storage to be used, more I/O operations to be performed, and less efficient I/O operations to be performed.

1.4 Overview of DB2 REORG and its Related Environments

IBM developed a product, DB2 REORG, that can reorganize existing DB2 data and index files. The result is a database with reduced diorganization. However, no user access to the database is allowed during reorginization. Hence, it is usually very desirable to perform the reorganization at a minimum amount of time as well as to be able to predict the time required.

In addition, it is necessary to record that a reorganization has been performed for recovery purposes. Information about execution of a utility is kept in one of the database managers special catalog tables. These tables (in normal operation) cannot be updated directly by a user. The database manager maintains these tables.

1.5 Multitasking and Multiprocessor Environments

Prior art "multitasking " facilities enable different programs to coexist in main memory simultaneously. Only one program at a time is able to run. However, when one program waits for, for example, its I/O (input and/or output) to complete, another program may run. I/O is usually directed by a separate controller, for example a disk drive controller. I/O is usually a slow process, compared to, for example, executing a program. Multitasking is often used to maximize the use of CPU (Central Processing Unit) time.

Prior art "multiprocessor" machines have two or more CPUs. When multiple CPUs are utilized, programs may be executed in parallel, one program per CPU. This concept can be used for simultaneous execution of programs that are independent of each other (e.g., programs that do not need data from one another during their respective operations).

Multitasking may of course be combined with multiprocessor arrangements to further enhance performance. Furthermore, programs running in multitasking and/or multiprocessor environments may be designed to communicate with each other. This enables processes that are not independent of each other to execute in parallel.

1.6 DB2 Tables

As illustrated in FIG. 2, a DB2 defines its own environment where data structures and file I/O are unique. A database may contain several "table spaces" and "indexes". A table space is a group of tables, and a table is a collection of data records (a table is what is generally termed database). The database may be stored an a single storage device or on multiple storage devices (disk drive, tape etc.) depending on whether a table is "simple", or "partitioned", or "segmented".

A simple table appears to the user as if it is stored linearly on a storage device (adjacent storage locations) even though its records may be mixed with other tables.

A partitioned table is divided into small groups, each group having adjacent storage locations. The groups, or partitions, can be located on different storage devices. Although the table is divided into groups, its behavior is as if it were a single table.

A segmented table is a table that is divided into groups (segments) that reside on the same storage device. Segmented tables are similar to simple tables, but cannot have records from different tables mixed within segments.

Segmented or partitioned tables may provide enhanced performance when accessing large data sets, since only a portion of the table has to be involved.

1.7 DB2 Indexes

A DB2 index is a set of pointers to data in a table. The index is stored separately from the table, but in the same database. The index is maintained by DB2, but can be checked, repaired, or reorganized by a user.

A "clustering index" defines the order in which records of a table are stored. Each table can have only one clustering index. The clustering sequence is the fastest sequence in which a table can be accessed.

Each index occupies its own index space (similar to table spaces), which is created simultaneously with the index. If a clustering index is created for a table in a partitioned table space, the index will also be partitioned into multiple index spaces.

1.8 DB2 I/O

A DB2 storage group is a set of volumes on a "direct access storage device" (commonly known as a DASD device). A DASD device can be a disk drive, a tape drive etc. A "volume" is a portion of DASD device that is referenced separately from the rest of the DASD device. A DASD device can have one or more volumes.

I/O is handled by DB2 in data units called "pages". A table space is divided into several equal sized portions (pages). DB2 reads and writes (I/O) data one page at a time.

Several pages are grouped together. A group of pages is preceded by a space map that contain information about the pages.

1.9 The DB2 Catalog Table

DB2 uses several database tables to track information about user databases, and for its own internal operation. DB2 limits access to these tables, in order to prevent users from accidentally changing vital information.

One of DB2's internal tables tracks the "access path" to database tables. An access path is a set of descriptors of what databases a program access and is allowed to access. This table is updated by DB2 as users enter new applications and tables into the DB2 environment and prevents users from accidentally altering DB2 system files.

Other essential DB2 system tables are a set of "catalog tables", one of which is the "recovery table" (e.g., SYSIBM.SYSCOPY) which is the table file being modified. It maintains information necessary to recover damaged data. However, there are cases when the tables inside the catalog table cannot be modified.

When the prior art REORG program is run, it updates the recovery table to reflect that some tables have been reorganized. Hence, it is vital that a program or routine that reorganizes one or more tables in the DB2 environment be able to update the table. Reorganizing DB2 tables without updating the recovery table will not allow the affected tables to be recovered correctly in the event of damage.

1.10 Internal Operation of DB2 REORG

IBM's DB2 REORG is mainly composed of six parts:
INITIALIZE
UNLOAD
RELOAD
SORT
BUILD
TERMINATE The INITIALIZE routine handles initialization of parameters used by UNLOAD, RELOAD, SORT, and BUILD.

UNLOAD reads all data from a data file on storage media and RELOAD writes the data back to the storage media and creates an index work file. SORT sorts the index work file, and BUILD builds the final index file. TERMINATE terminates program execution and releases resources like disk drives, main memory etc.

The UNLOAD routine reads one data row at the time from the data file using a sequential scan (i.e., data rows are read in the order they are stored on the storage medium, except in the case of indirect references) or by utilizing one of the cluster indexes. Partitions are unloaded one at a time. UNLOAD utilizes existing features of the DB2 environment, such as data and buffer managers.

The execution speed of the UNLOAD routine is highly dependent on the amount of I/O required (input or output operations). The amount of I/O is, in turn, dependent on the amount of disorganization of the database. Disorganization results in an increased amount of I/O operations and possibly very inefficient ordering of these operations.

RELOAD writes the data rows back to the data file in an organized manner during which new pointers or RIDs (Row Identification Numbers) are assigned, index keys are extracted, and an index work file is created, composed of key/RID pairs. Partitions are reloaded one at a time.

The SORT routine sorts the index work file by the key/RID values. It groups the entries together by which index they belong to.

The BUILD routine builds indexes from the sorted index work file, one index at a time.

Execution of the program parts that make up IBM's DB2 REORG is sequential, which means that program execution starts with INITIALIZing parameters and continues with execution of the other program parts in sequence, one at a time.

Most methods of doing things involve a sequential order, i.e., the second floor of a building is constructed before the third floor. However, portions of a sequential method may be performed in parallel.

Similar principles could be applied to software and the DB2 reorganization process in particular; albeit many problems need to be resolved.

The above routines, UNLOAD, RELOAD, SORT, and BUILD, do not utilize parallelism. Significant performance improvements may be realized with the proper synchronization scheme and software (or software equivalent hardware), running on a machine with multitasking and/or multiprocessor facilities. Most machines that run DB2 do provide multitasking and multiprocessor facilities.

1.11 Problems with DB2 REORG

The execution speed of the prior UNLOAD routine is highly dependent on the amount of I/O required (input or output operations). The amount of I/O is, in turn, a function of the amount of disorganization of the data base. Disorganization results in an increased amount of non-sequential I/O. Performance may be further degraded by using one of the indexes to unload data, depending on the amount of "out-of-orderness". If the index is severely disorganized, many additional non-sequential I/O cycles may be required to resolve indirect pointer references.

The extent of partitioning of tables also affect the performance of UNLOAD since they are unloaded one at a time.

The prior UNLOAD utilizes existing DB2 system components, the data and the buffer managers, to perform the actual I/O of tables and indexes. These system components do not perform at an optimum level. Partitions could actually be loaded in parallel since DB2 runs on machines that provide multitasking as well as multiprocessing (multiple CPUs). Furthermore, the buffer manger (a routine that handles I/O between application programs and DASD devices) does not organize data pages and space maps for maximum performance.

Data pages are written to the DASD device consecutively until the last data page of a set. At that point, I/O stops, the space map associated with that range of pages is updated, and a new space map is initialized for the consecutive set of data pages. The new space map, followed by the data pages for that set, resumes the I/O process.

Initialization of I/O to DASD devices is a slow process, where mechanical parts, read and write heads, must be positioned to a specific location of the disk or tape etc. (the precise location of data to be read or written). Common practice to minimize DASD initializations includes writing large sets of data at a time.

Similar constraints apply to the prior RELOAD routine, because it is involved with partitions and I/O in analogous ways.

2. SUMMARY OF THE INVENTION

2.1 Overview of the Improved Reorganization Method

The improved reorgainization method comprises four major routines. The routines include, but are not limited to, (1) concurrent indexing and sorting (concurrent with reloading data), (2) concurrent unloading of partitions, (3) efficient treatment of space maps and data pages during reload, and (4) means to reduce access constraints to the recovery table.

These four major routines may not necessarily appear as isolated sub-programs or routines in the method. For example, indexing usually takes place while the data is reloaded into the database.

2.2 Concurrent Indexing

The concurrent indexing feature enables a reduction of execution time by making better use of available system resources. The concurrent indexing process occurs simultaneously with the reload process and allows for indexes to be built concurrently. Concurrent processing may enhance performance for indexing if multiple indexes are used.

The heat of the problem lies in that pointers must be assigned before key/pointer pairs can be written to the index work file (because indexing entails assigning values from the data base to the key/pointer pairs that are stored in the index file). Furthermore, indexing requires that the key values and their locations in the database be known before indexing starts.

The concurrent indexing program routine is started simultaneously with the improved RELOAD routine. Conventionally, the final locations of the data in the data file are not known until RELOAD is complete. The method of the invention addresses this problem by performing RELOAD simulations of the data during the actual unloading process. The unloading process occurs prior to the reloading process. The simulation consists of performing substantially identical steps to those of the RELOAD process. However, some of the steps in the reloading process are omitted. Data is never physically written during the simulation process, and, naturally, no attention is given to the organization of space maps or data pages in general.

2.3 I/O Efficiency

The efficient reload process of the invention addresses some of the weaknesses in the DB2 I/O process. DB2 reads and writes data in units of pages, as illustrated in FIG. 3. Pages are grouped together and associated with a space map. Information describing available space and location of pages etc. is stored in space maps. Each group of pages is logically (the order in which data is read or written) preceded by a space map. DB2 generally processes space maps and the associated data pages in their logical order, that is, a space map is always read or written before its associated data pages.

The pages associated with a space map may efficiently be read from or written to (for example) a permanent storage device. Each page may be queued for asynchronous I/O (a queue is comparable to a regular waiting line, "first come first serve"). Special I/O processors such as disk drive controllers empty the queue independently of the program execution. The I/O queue enables the program to continue its execution as if the I/O already has taken place. It will be recognized by those skilled in the art that I/O is usually a slow process compared to program execution.

The sequential I/O process is temporarily halted by DB2 when the writing process of a group of pages is finished (all its pages are written). At that time, DB2 updates a new space map according to the contents of the following data page group. The space map is written and the I/O queuing process continues.

The method provides for its own I/O, independent of DB2, thereby enhancing the I/O algorithm. The space maps are updated while their respective data pages are being written, and are themselves written after their respective data pages. The space maps are then moved from their respective current locations to their respective preceding locations, as shown in FIG. 3. This process permits streamlined I/O throughout the entire set of space maps and data pages.

2.4 Updates of the Recovery Table

As noted above, the recovery table contains information about the data files and their tables and indexes. Access mechanisms within the method of the invention allow access to several DB2 system files, among them the recovery table.

By creating a table with an identical structure to the recovery table, DB2 permits access to this table because it is a user table. The program or routine that is to access the recovery table is then written as if it would access the copy instead. The program, or routine, is then compiled and built, utilizing standard programming tools familiar to those skilled in the art. The DB2 file containing the access paths is modified using the standard DB2 repair utility. The modification includes changing the database ID and the table ID of the duplicate files, to those used by the recovery table. DB2 is thereby "fooled" into believing that it is the user copy of the recovery table that is being accessed, when in reality the recovery table itself is being accessed.

2.5 Concurrent Unloading of Partitions

The method includes steps to increase throughput when unloading partitions. The steps estimating available system resources such as available memory, storage devices, CPUs etc.; the extent of partitioning is also taken into consideration. The estimate is used to determine how the partitions are to be distributed among CPUs and to what extent multitasking is to be used. Storage devices and memory are also assigned during this process. These steps, or optimizations, are undertaken prior to starting the unload process. The resource assignments are further used for purposes of subsequent reloads of data and indexes.

The unload process uses the assignments from the optimization process to unload data tables from a group of storage devices. The assignments determine which CPU is going to unload a given group of partitions. Each CPU has a single storage device or a group of storage devices assigned, as well as a portion of memory as shown in FIG. 4. Each CPU processes its group of partitions by means of multitasking, where each task may perform unloads of one or more partitions.

3. BRIEF DESCRIPTION OF THE DRAWINGS

FIG. 1 illustrates a typical database.

4. DETAILED DESCRIPTION OF SPECIFIC EMBODIMENTS

4.1 Pseudo Code Appendices

The invention may usefully implemented by programming a computer to perform the functions described herein. The appendices at the end of this specification show a "pseudo code" program, in "structured English" format, of an example design for a computer program in accordance with the invention. The pseudo code is intended as a general description and is not meant to be limiting.

For convenience of illustration, the pseudo code is broken down into a number of routines. However, those skilled in the art will appreciate that some of the routines may be combined, and others may be broken down further, depending on the particular circumstances of implementation.

The actual optimum organization and structure of a computer program in accordance with the invention will depend greatly on the characteristics of the system on which the invention is implemented. Certain functions described in the pseudo code may not be available on a given machine and must be simulated; or, a group of functions described herein may be able to be collapsed into fewer function on another machine.

The pseudo code is only an outline and does not necessarily set forth a complete program listing. For example, testing for boundary conditions or errors is sometimes described explicitly in the pseudo code and sometimes is referred to implicitly. By and large, the pseudo code does not set forth error trapping/handling or similar functions.

It will be recognized by those of ordinary skill that, given the benefit of this disclosure, the implementation of a computer program on any given model of computer running any given architecture, to take advantage of the features of the computer and operating system, is a matter of conventional programming for those familiar with the particular computer and operating system.

The main program, Appendix A, illustrates the main events that take place during program execution. It directs the process to the UNLOAD and RELOAD WITH CONCURRENT INDEXING routines in sequence; initiates the production of image copies; and performs updates to the recovery table.

Figure 2:
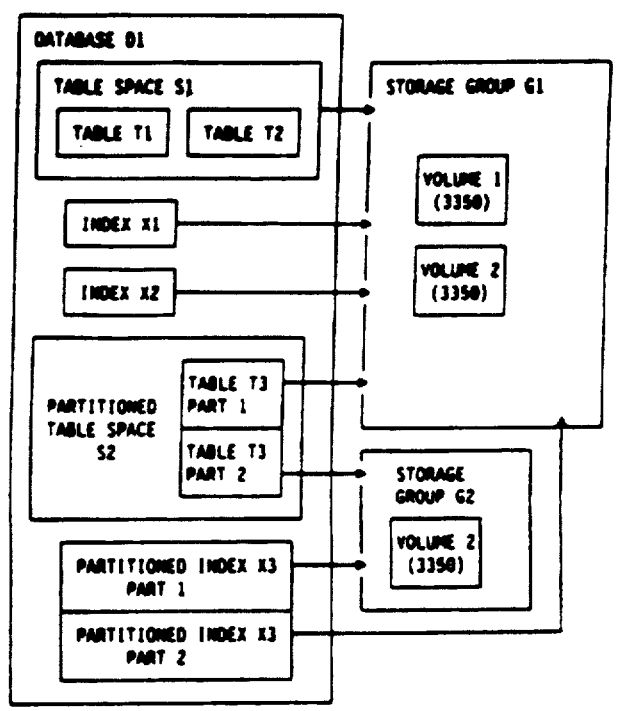
FIG. 2 illustrates a specific DB2 database.
Figure 3:
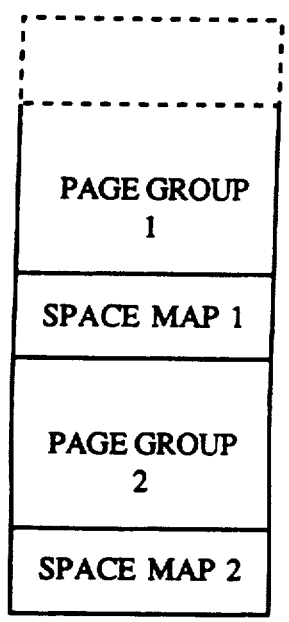
FIG. 3 shows a series of space maps and data pages before and after the shifting process of said space maps.
Figure 3:
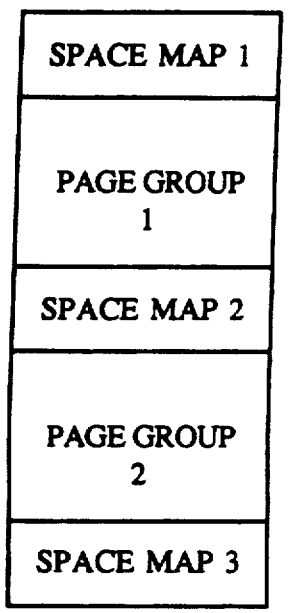
Figure 3:
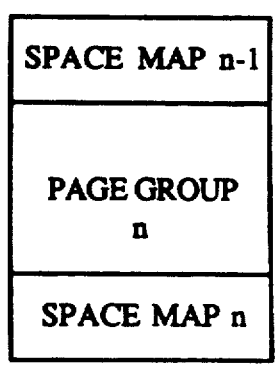
Figure 3:
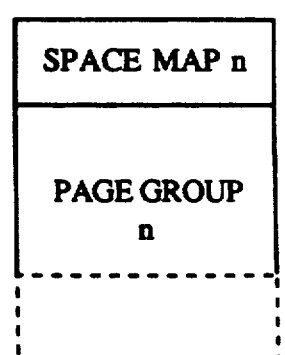
Figure 4:
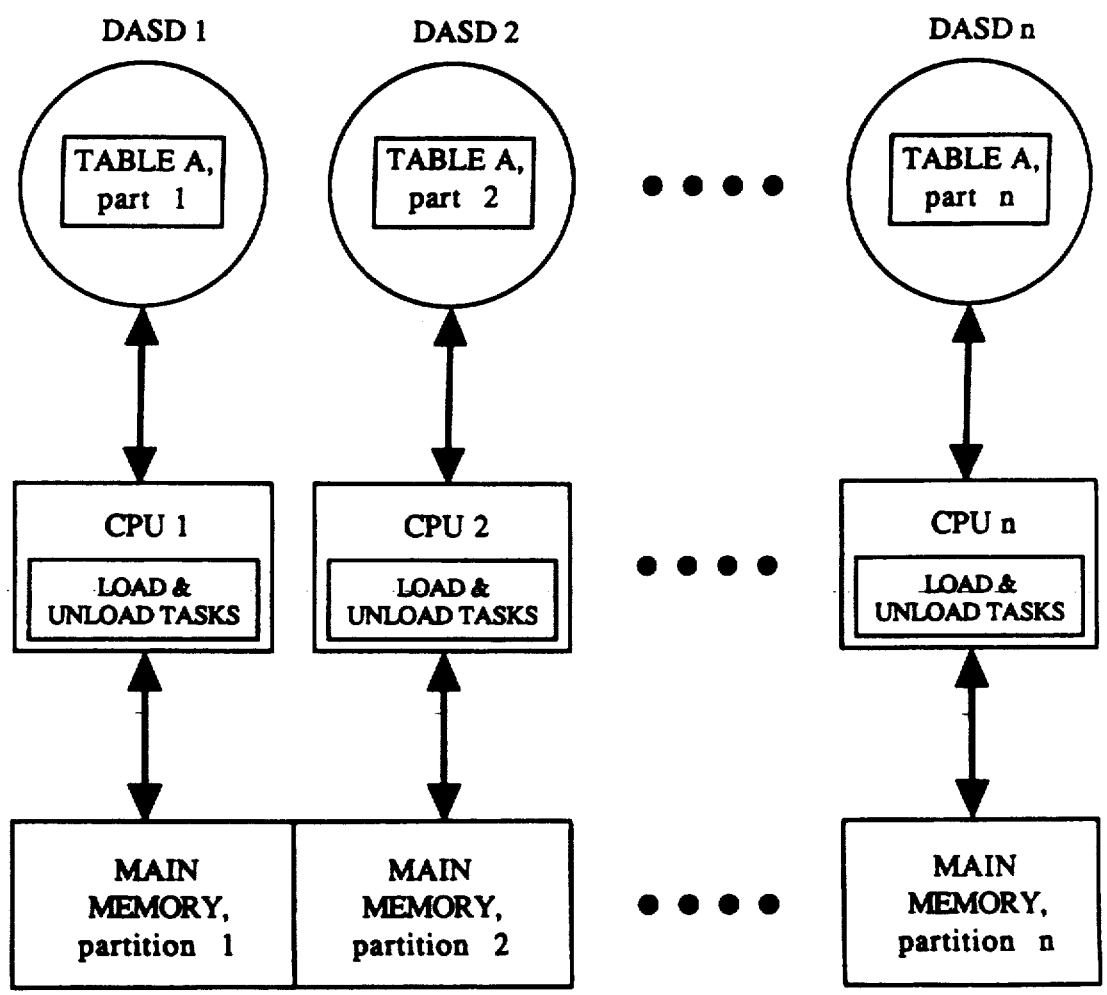
FIG. 4 shows assignments of system resources for purposes of unloading and reloading datafile partitions.
Figure 5:
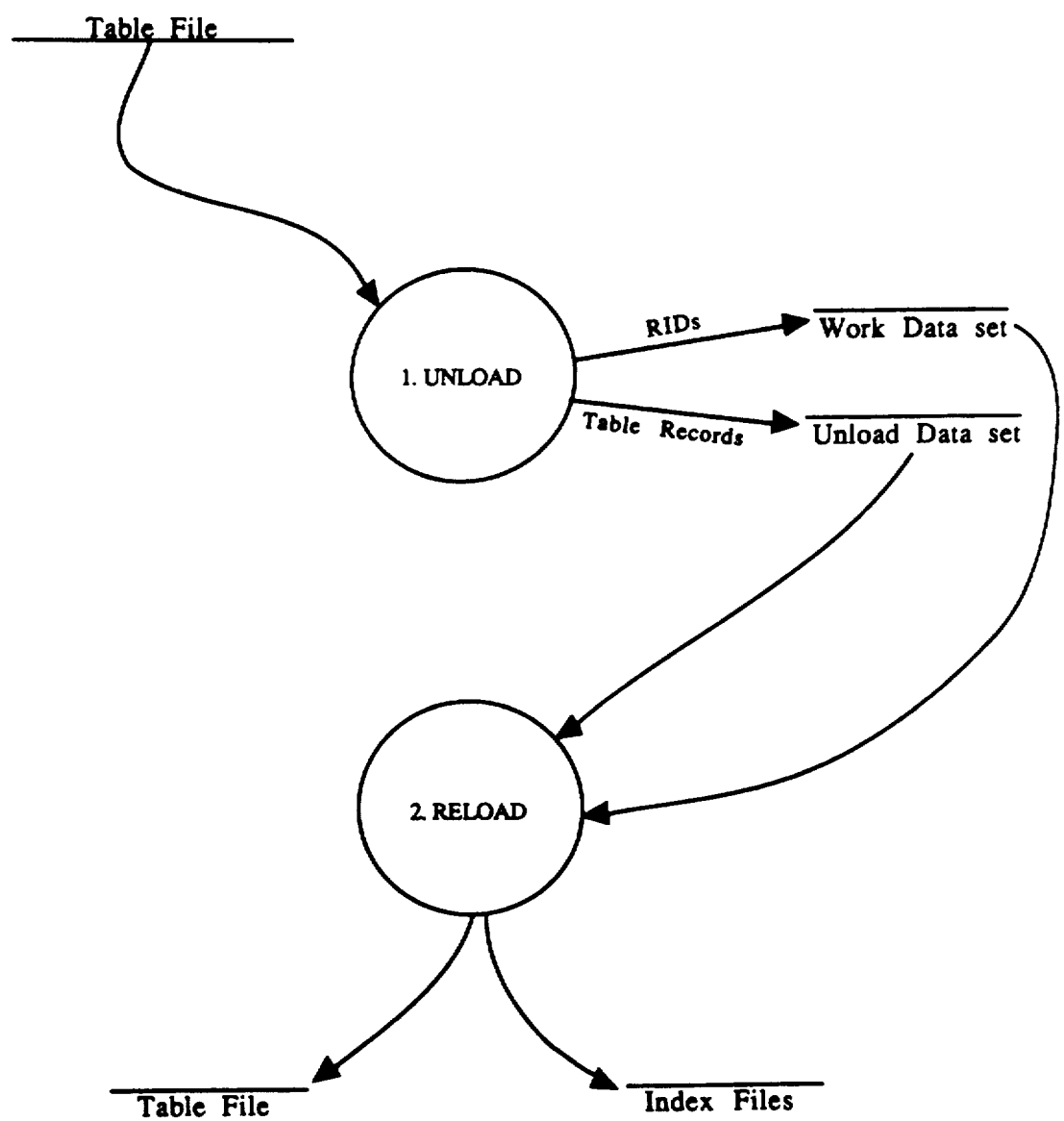
FIG. 5 shows the general data flow in the method.
Figure 6:
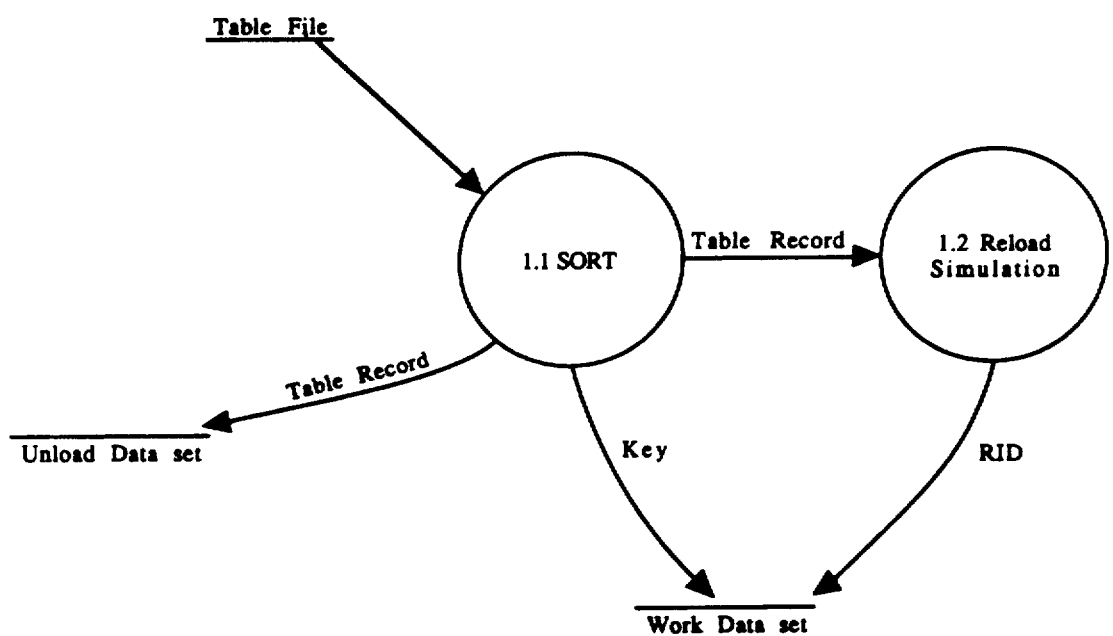
FIG. 6 illustrates the data flow in the UNLOAD routine.
Figure 7:
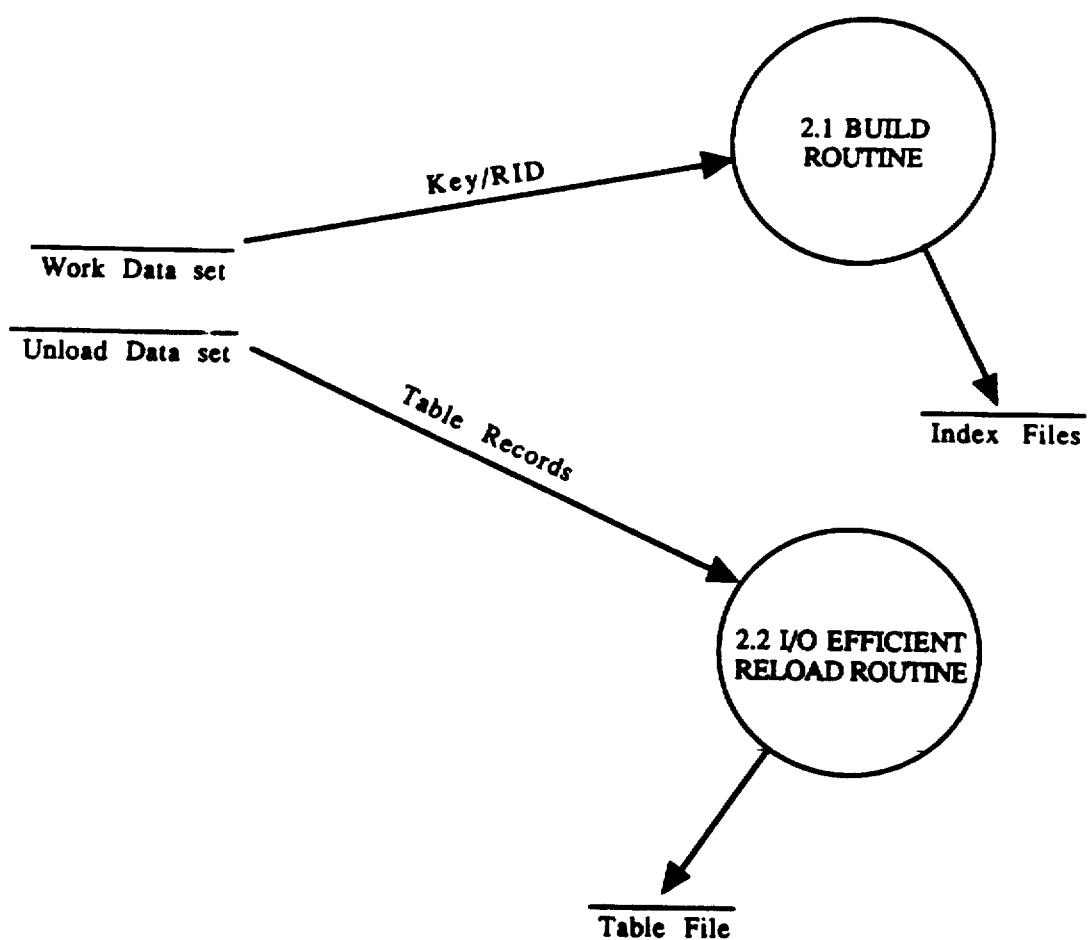
FIG. 7 illustrates the data flow in the RELOAD routine.

FIGS. 5, 6 and 7 are included to show the data flow of the reorganization method. FIG. 5 is a high level illustration of the method. FIG. 6 shows the UNLOAD method in more detail, and FIG. 7 shows the RELOAD method in more detail.

4.2 The UNLOAD Routine

The UNLOAD routine, Appendix B, starts by initiation of the LOAD BALANCING ROUTINE, at step B1. The load balancing routine examines available system resources such as memory available, the number of CPUs, the number of available storage device, etc. It uses that information in conjunction with the organization of the data tables, partitions etc., to determine how the work load of the unload process is optimally distributed among the available resources.

Sorting of the unloaded rows in the data table, at step B2, is performed subsequently to the termination of the LOAD BALANCING ROUTINE. The sorted rows become available, one by one, as they are processed by the sort routine, at step B3.

The sort routine is usually part of the operating system. The sort is undertaken to make logically adjacent rows physically adjacent. Logically adjacent rows are rows that are accessed in sequence, but are not necessarily adjacently stored on the storage device. Physically adjacent rows are adjacently stored as well as accessed.

The "row ID" (RID) of the final storage location (the pointer) is determined by simulating the reload process, at step B4. The simulation performs all but the data transfer steps of the actual reload process.

The keys that are used in the indexes are extracted from the database row, at step B5, and the row is stored until further processing can take place, at step B6. The key/pointer pair (key/RID pair) is temporarily stored until further processing can take place, at step B7, and the process is repeated by processing subsequent data rows, at step B7.

4.3 The LOAD BALANCING Routine

The Load Balancing routine, Appendix C, begins with an INITIALIZATION routine, called at step C1. The INITIALIZATION routine assigns start-up values (default values) to the parameters that the LOAD BALANCING routine estimate.

The process proceeds by entering into optimization, testing the maximum number of available tasks, at step C2. The optimization terminates if only one task is available, one available task means that no optimization, with respect to parallel processes, can be done.

The next step is to determine if sorting of the database rows is to be performed during the actual unloading process, at step C3. The "order" is a parameter which is set prior to starting the reorganization process; it determines when the database rows are sorted. If this parameter is set then the MAXIMUM TASKS ROUTINE is performed. This routine determines the maximum number of tasks that can be available, depending on system resources available for the sort routine.

The subsequent step C4 performs tests to certify that the assigned tasks do not require more memory than is available, and that the calculated task assignment is valid, i.e. greater than or equal to 1.

The PARTITION UNLOAD ROUTINE, at step C5, is performed to calculates an optimal number of partitions to be assigned to each task.

The SORT TEST ROUTINE is performed, at step C6, to determine the number of temporary work files to be used during the sort process. It is also verified that there is sufficient memory available.

The CALCULATE MEMORY ROUTINE is performed, at step C7, to determine the amount of memory available to each active sort task.

4.4 The INITIALIZATION Routine

The INITIALIZATION routine, Appendix D, assigns the default values described above. The number of partitions per task and the temporary work files for sorting are set to 64 and two respectively, at steps D1 and D2. The memory required per active task and open partition is calculated, at steps D3 and D4. The "task work area" per "open partition" is calculated, at step D5. The task work area is group of memory locations that are reserved for a particular task. Open partitions are portions (partitions) of a table that have been initiated for I/O, i.e. have been identified by program routines that may make use of data in the partitions.

The available memory below and above a 16 megabyte (MB) boundary line is obtained, at steps D6 and D7. The boundary line originates from older versions of IBM machines that could not access more than 16 MB of memory. The maximum number of active CPUs is obtained, at step D8.

The memory available for all active sorts is calculated, at step D10, by including the memory below and above the 16 MB boundary lines and subtracting memory required by reentrant sort routine. (A reentrant routine includes provisions that enables the routine to call itself.)

Finally, the memory required per task is adjusted. The installation specified amount of memory per active task is added to the value previously calculated, at step D11, and the ACTIVE TASKS routine is performed, at step D12. The ACTIVE TASKS routine calculates the maximum number of active tasks available.

4.5 The ACTIVE TASKS Routine

The ACTIVE TASKS routine, Appendix E, calculates the maximum number of active tasks. A first test is performed, at step E1, to determine if the calculated maximum number of tasks is fewer than the installation specified number of tasks. If not, (test is false) the maximum number of tasks is set to the installation specified number of tasks, and the Active Tasks routine is terminated.

If the first test is true, a second test is performed, at step E1.1.a. The calculated number of tasks is compared to the number of active CPUs. If more than two CPUs are active, the comparison is performed on one less CPU. If there are more active CPUs than calculated maximum tasks (test is false), the maximum number of active tasks is set to the calculated maximum tasks.

If the second test is true, a third test is performed, at step E1.1.a.i.I. The third test determines whether the number of partitions are less than the number of active CPUs, less 1 CPU of more than two CPUs are active. If the number partitions are less than the number of active CPUs (test is true) the maximum number of active tasks is set to the number of partitions. Otherwise, the maximum number of tasks are set to the number of active CPUs, less one CPU if more than two CPUs are present.

Processing is resumed in the INITIALIZE routine, at step E2.

4.6 The MAXIMUM TASKS Routine

The MAXIMUM TASKS routine, Appendix F, calculates the number of active tasks depending on resources available for the sorting routine.

A first test is performed, at step F1, to determine if the total number of sort files divided by the number of sort files per active task is less than the total available memory for all active sorts divided by the required memory per active task. If so (test is true), a second test is performed, at step F1.1.a, to determine if the number of sort files divided by the number of sort files per task is less than one (test is true). If the second test is true, the maximum number of active tasks is set to 1 . If the second test is false, the maximum number of tasks is set to the total number of sort files divided by the number of sort files per task.

If the first test is false, a third test is performed, at step F1.2.a, to determine if the memory available for all active sorts divided by the memory required per active task is less than one (test is true). If so, the maximum number of active tasks is set to one.

In the case of the third being false, the maximum number of active tasks is set to the total memory available for all sorts divided by the required memory per active task.

The last step in the MAXIMUM TASKS routine, at step F2, is to return program control to the LOAD BALANCING routine.

4.7 The TEST TASKS Routine

The Test Tasks routine, Appendix G, determines if enough memory is available for the previous task assignments. The first step is to determine if a plurality of tasks have been assigned.

A first test is performed, at step G1, to determine whether the number of active tasks are fewer than one (test is true). If so, a message is reported to indicating that further processing is stopped, and processing is stopped.

If the first test is false, the required memory per active task is calculated. The memory required per active task is multiplied by the maximum number of active tasks, at step G2. The result is substracted from the available memory for all active tasks; any remainders are stored, at step G3.

A second test is performed, at step G4, to determine if there is enough memory available. If not, a message reflecting that condition is issued, at step G4.1.a, the maximum number of active tasks are reduced, at step G4.1.b, and the first test is performed again, at step G4.1.c.

4.8 PARTITION UNLOAD Routine

The PARTITION UNLOAD routine, Appendix H, calculates the number of partitions that each task is to unload. Several tests are performed.

The first test, at step H1, determines if the remainder, from the Test Task routine, divided by the required memory per open DB2 partition is less than the number of partitions. If so (test is true), a second test is performed, at step H1.1.a, to determine the same remainder divided by the required memory per open DB2 partition is less than one. If so (test is true), a constrained by memory message is issued, at step H1.1.a.i.I, the maximum number of tasks are decreased, at step H1.1.a.i.II, and processing continues at C4 in the LOAD BALANCING ROUTINE. If the second test is false, the number of partitions unloaded per task is set to the same remainder divided by the required memory per open DB2 partition, at step H1.1.a.ii.

If the first test is false, a third test is performed, at step H1.2.a.i, to determine if the number of partitions is less than one. If so (test is true), an constrained by memory message is issued, at step H1.2.a.i.I, the maximum number of tasks are decreased, at step H1.2.a.i.II, and processing is returned to C4 in the LOAD BALANCING ROUTINE. If the third test is false, the number of partitions unloaded per task is set to the number of partitions, at step H1.2.a.ii.

4.9 The SORT TEST Routine

The SORT TEST routine, Appendix I, verifies that sort file assignments correspond to the task assignments. It also directs control to the VERIFY SORT SPACE ROUTINE, which verifies that the sort routines have enough work space assigned for proper operation.

The SORT TEST routine performs its first test to determine if sorting is to occur in parallel with unloading data, at step I1. If not, control is returned to the LOAD BALANCING ROUTINE, at step I1.2. Otherwise, the number of work files per active task, for the sort routines, are calculated, at step I1.1.a. The total number of work files per active task are divided by the maximum number of tasks, at step I1.1.b.

A second test is performed, at step I1.1.c, to determine if the previous calculations resulted in a remainder. If so (test is true), the maximum number of tasks are decreased and control is returned to C4, in the LOAD BALANCING ROUTINE, at steps I1.1.c.i.I and I1.1.c.i.II.

The VERIFY SORT SPACE ROUTINE is performed, at step I1.1.d, subsequently to the second test, and control is returned to the LOAD BALANCING routine, at step I2.

4.10 The VERIFY SORT SPACE Routine

This routine, Appendix J, verifies that sufficient work space is available for the sort routines.

The size of one work file for sort routines is multiplied by the number of work files, for sort routines, per task, at step J1, resulting in "the total file size for sorting". A first test is performed, at step J2, to determine if the average partition size times five percent overhead times the number of partitions unloaded per task is less than the "total work file size for sorting". If so (test is true), control is returned to the SORT TEST ROUTINE, at step J2.2.

If the test is false, a "constrained by sort work file" message is issued, at step J2.1.a, the number of partitions unloaded per task is decreased, at step J2.1.b, and a second test is performed, at step J2.1.c.

The second test determines if the number of partitions unloaded per task is less than one. If so, the maximum number of tasks are decreased by one, at step J2.1.c.i.I, and controlled is returned to C4 in the LOAD BALANCING ROUTINE, at step J2.1.c.i.II.

If the second test is false, the VERIFY SORT SPACE ROUTINE is performed once more.

4.11 The CALCULATE MEMORY Routine

This routine, Appendix K, calculates the available memory for each active sort routine.

The memory available for all active sort routines is divided by the maximum number of tasks, "memory per active sort", at step K1. The required memory per task for all open DB2 partitions is subtracted from the above "memory per active sort", at step K2, resulting in a "net amount of sort memory".

A first test is performed, at step K3, to determine if the "net amount of sort memory" is less than the installation specified maximum memory per active sort. If not, proecssing continues by a third test, at step K4.

Otherwise, a "constrained by memory" message is issued, at step K3.1.a. A second test is performed, at step K3.1.a, to determine if the maximum number of active tasks is one. If it is, The maximum memory per active sort is set to "net amount of sort memory", from above, at step K1.1.b.i. Otherwise, the maximum number of active tasks are decreased, at K3.1..b.ii.i, and processing returned to C4 in the LOAD BALANCING ROUTINE, at step K3.1.b.ii.II.

The third test, at step K4, determines whether there is sufficient memory available below the 16MB boundary line, and if the sort routines only work below that boundary line. If they do (test is true), processing continues, at step K5, by returning control to the LOAD BALANCING routine.

If the third test is false, an constrained by memory message is issued, at step K4.2.a, and a fourth test is performed, at step K4.2.b, to determine if the number of active sorts is one. If it is (test is true), the maximum number of tasks is set to the "net amount of sort memory" from above, at step K4.2.b.i.

If the fourth test is false, the maximum number of active tasks are decreased by one, at step K4.2.b.ii.I, and processing resumes at C4 in the LOAD BALANCING ROUTINE, at step K4.2.b.ii.II.

4.12 The RELOAD WITH CONCURRENT INDEXING Routine

This routine, Appendix L, reloads data, tables etc., to permanent storage devices. Indexes may be built simultaneously with the reload process.

The process starts by performing the BUILD ROUTINE and the RELOAD I/O ROUTINE, at step L1. Program control is subsequently returned to the Main program, at step L2.

4.13 The BUILD Routine

This routine, Appendix M, builds indexes concurrently with the reload process.

Key/Pointer pairs are sorted, at step M1, using a standard sort utility program, available as part of the operating system on modern computers. The sorted Key/Pointer pairs are read, at step M2, as they are processed by the sort utility, and are entered into index files, at step M3. The DB2 files structure is maintained. The process is continued at step M2 until all key/Pointer pairs are read.

Program control is returned to the RELOAD WITH CONCURRENT INDEXING ROUTINE, at step M5.

4.14 RELOAD I/O Routine

This routine, Appendix N, performs the physical I/O between memory and permanent storage devices. It conforms to the DB2 file structures as well as the Buffer structures. The buffer structure is focused around space maps and data pages, where the data pages consists of a groups of pages.

The process starts by initializing a space map, at step N1. The space map is written to a database dataset at page one (I/O page number one), at step N2. The page number of the first page is stored in the current space map and in a temporary variable, MAP#, at step N3. The first data page is initialized in memory, at step N4. A row (data record) is loaded into the current page in memory, at step N5. A test is performed, at step N6, to determine if the current page is full. If not, processing continues with performing the SPACE MAP SHIFT routine, at step N7.

Otherwise (page is not full), the space map is updated for the current data page, at step N6.1.a, the page is written to the storage media, at step N6.1.b, and a second test is performed to determine if the space map is full, at step N6.1.c.

If not (space map not full), processing continues at step N5 until all rows, data records, are processed, at step N6.1.d.

Otherwise (space map is full), the current page is written to the proper storage media, at step N6.1.c.i.I, the next space map is initialized in memory, and the variable MAP# is set to the current page number, at step N6.1.c.i.II.

The process is repeated at step N5, until all rows, data records, are processed, at step N6.1.d.

The SPACE MAP SHIFT ROUTINE is performed, at step N7, and program control is returned to the Reload with Concurrent Indexing routine, at step N8.

4.15 The SPACE MAP SHIFT Routine

This routine, Appendix O, adjusts the organization of space maps in the data table, to conform the DB2 standard.

The RELOAD I/O routine places the space maps after their corresponding data pages, whereas DB2 expects to find the space maps before their corresponding data pages. The SPACE MAP SHIFT routine therefore starts by making the last space map, in the dataset, the current space map, at step O1. The prior space map is temporarily stored in memory, at step O2. The current space map is move to the location of the prior space map, at step O3. The temporarily stored prior space map is made the current space map, at step O4. The process is continued at step O2, until all space maps are moved, at step O5.

Program control is subsequently returned to the RELOAD I/O routine, at step O6.

5. CONCLUSION

While the invention is susceptible to various modifications and alternate forms, specific embodiments thereof have been shown and described by way of example. Different variations are plainly possible. For example, functions described above as performed by a programmed machine could alternatively (and equivalently) be performed by suitable discrete-logic circuitry, built out of individual components or in one or more integrated circuits, in a manner that is routine to those of ordinary skill having the benefit of this disclosure.

The reverse is also true, of course, namely that functions performed by hardware can alternatively (and equivalently) be performed by programmable general-purpose circuitry that has been suitably programmed, again in a routine manner.

It should be understood that the invention is not limited to the particular forms disclosed, but on the contrary, the invention is to cover all modifications, equivalents, and alternatives falling within the spirit and scope of the invention as defined by the appended claims.

APPENDIX A, MAIN ROUTINE

A1. Perform the UNLOAD routine

A2. Perform the RELOAD WITH CONCURRENT INDEXING routine

A3. Produce image copies

A4. Update Recovery table

A5. (END)

APPENDIX B, UNLOAD ROUTINE (Called from MAIN (REORG PLUS))

B1. Perform the LOAD BALANCING routine

B2. Unload data rows to SORT utility program until end of table

B3. Get next row from database page

B4. Get row ID (RID) of final destination, by simulating loading of row into table (Row is assigned to the current page; next page if it will not fit)

B5. Extract key(s) from row for table index(es) (from the catalog table) (Build keys by extracting column values from row which make up the key)

B6. Write row to unload dataset

B7. Write key/RID pair to work data set

B8. Repeat at B3 until no more rows from SORT output

B9. (RETURN)

APPENDIX C, LOAD BALANCING ROUTINE (Called from the UNLOAD routine)

C1. Perform the INITIALIZATION routine (Optimization)

C2. IF-THEN-ELSE test: Is Maximum number of tasks 1?

1) YES: (RETURN)

2) NO: Continue

C3. IF-THEN-ELSE test: Sorting during UNLOAD (Cluster index exists and ORDER value is YES)?

1) YES: Perform the MAXIMUM TASKS routine

2) NO: Continue

C4. Perform TEST TASKS routine

C5. Perform PARTITION UNLOAD routine

C6. Perform SORT TEST routine

C7. Perform CALCULATE MEMORY routine

C8. (RETURN)

APPENDIX D, INITIALIZATION ROUTINE (Called from the LOAD BALANCING routine)

D1. Set unload partitions to 64 per task

D2. Set work files for sort routine to 2 per task

D3. Calculate memory required per active task

D4. Calculate memory required per open DB2 partition

D5. Calculate task work area requirements per open partition (Calculate memory available for all active tasks)

D6 Obtain memory available below 16MB line

D7. Obtain memory available above 16MB line

D8. Obtain number of active CPUs

D9. Obtain installation specified maximum memory available per active sort (Calculate memory available for all active sorts)

D10. Set Memory available to memory below 16MB line PLUS memory above 16MB line (if applicable) MINUS memory for reentrant sort modules (Adjust memory required per active task )

D11. Set memory required per task to Previous amount PLUS Installation specified maximum memory per active sort D12. Perform the ACTIVE TASKS routine

D13. (RETURN)

APPENDIX E, ACTIVE TASKS ROUTINE (Called from the INITIALIZE routine)

(Calculate maximum number of active tasks)

E1. IF-THEN-ELSE test: Is Command specified maximum tasks LESS THAN Installation specified maximum tasks?

1) YES:

a) IF-THEN-ELSE test: Is Number of active CPUs LESS THAN Command specified maximum tasks (MINUS 1 IF more than 2 CPUs)?

i) YES:

I) IF-THEN-ELSE test: Is Number of partitions LESS THAN Number of active CPUs (MINUS 1 IF more than 2 CPUs)?

x) YES: Set Maximum number of active tasks to number of partitions xx) NO: Set Maximum number of active tasks to number of active CPUs (MINUS 1 IF MORE THAN 2 CPUs)

ii) NO: Set Maximum number of active tasks to Command specified maximum tasks

2) NO: Set Maximum number of tasks to Installation specified maximum tasks

E2. (RETURN)

APPENDIX F, MAXIMUM TASKS ROUTINE (Called from the LOAD BALANCING routine)

(Calculate Maximum number of active tasks, depending on sort resources)

F1. IF-THEN-ELSE test: Is Number of sort files DIVIDED by Number of sort files per task LESS THAN Memory available for all active sorts DIVIDED by Memory required per active task?

1) YES:

a) IF-THEN-ELSE test: Is Number of sort files DIVIDED by Number of sort files per task LESS THAN 1?

i) YES: Set Maximum number of active tasks to 1 ii) NO: Set Maximum number of active tasks to Number of sort files DIVIDED by Number of sort files per task

2) NO:

a) IF-THEN-ELSE test: Is Memory available for all active sorts DIVIDED by memory required per active task LESS THAN 1?

i) YES: Set Maximum number of active tasks to 1 ii) NO: Set Maximum number of active tasks to Memory available for all sorts DIVIDED by memory required per active task

F2. (RETURN)

APPENDIX G, TEST TASKS ROUTINE (Called from the LOAD BALANCING routine)

G1. IF-THEN-ELSE test: Is Maximum number of active tasks LESS THAN 1?

1) YES:

a) Issue "Terminate processing" message b) Terminate further processing

2) NO: Continue ( Calculate memory required for all active tasks)

G2. MULTIPLY Memory required per active task by Maximum number of active tasks

G3. SUBTRACT above value from memory available for all active tasks (SAVE "Remainder")

G4. IF-THEN-ELSE test: Is there enough memory?

1) NO:

a) Issue "Constrained by memory" message b) DECREASE Maximum number of tasks c) Loop to G1

2) YES: Continue

G5. (RETURN)

APPENDIX H, PARTITION UNLOAD ROUTINE (Called from LOAD BALANCING routine)

(Calculate Number of partitions unload per task)

H1. IF-THEN-ELSE test: Is "Remainder" (from TEST TASK routine) DIVIDED by Memory required per open DB2 partition LESS THAN Number of partitions?

1) YES:

a) IF-THEN-ELSE test: Is Remainder DIVIDED by Memory required per open DB2 partition LESS THAN 1?

i) YES:

I) Issue "Constrained by memory" message

II) Decrease Maximum number of tasks

III)   Return to C4 ii) NO: Set Number of partitions unloaded per task to Remainder DIVIDED by Memory required per open DB2 partition

2) NO:

a) IF-THEN-ELSE test: Is Number of partitions LESS THAN 1?

i) YES:

I)    Issue "Constrained by memory" message

II)   Decrease Maximum number of tasks

III)  Return to C4 ii) NO: Set Number of partitions unload per task to Number of partitions

H2. (RETURN)

APPENDIX I, SORT TEST ROUTINE (Called from the LOAD BALANCING routine)

I1. IF-THEN-ELSE test: Is Sorting during unload active?

1) YES:

a) Calculate Number of sort work files per task b) DIVIDE Number of sort files per task by Maximum number of tasks c) IF-THEN-ELSE test: Is there a remainder from above operation?

i) YES:

I) DECREASE Maximum number of tasks

II) Return to C4 ii) NO: Continue d) Perform VERIFY SORT SPACE routine

2) NO: Continue

I2. (RETURN)

APPENDIX J, VERIFY SORT SPACE ROUTINE (Called from the SORT TEST routine)

(Verify that enough sort space is available)

J1. MULTIPLY size of one sort work file by Number of sort files per task

J2. IF-THEN-ELSE test: Is Average partition size TIMES 5% Overhead TIMES NUmber of partitions unloaded per task LESS THAN Value above?

1) NO:

a) Issue "Constrained by sort work file size" message b) DECREASE Number of partitions unloaded per task c) IF-THEN-ELSE test: Is number of partitions unloaded per task LESS than 1?

i) YES:

I) DECREASE Maximum tasks by 1

II) Return to C4 ii) NO: Continue d) Continue at J1

2) YES: Continue

J3. (RETURN)

APPENDIX K, CALCULATE MEMORY ROUTINE (Called from the LOAD BALANCING routine)

(Calculate memory available per each active sort)

K1. DIVIDE Memory available for all active sorts by Maximum number of tasks

K2. SUBTRACT Memory required for all open DB2 partitions per task from above

K3. IF-THEN-ELSE test: Is above value LESS THAN Installation specified maximum memory per active sort?
1) YES:

a) Issue "Constrained by memory" message b) IF-THEN-ELSE test: Is the Maximum task 1?

i) YES: Set memory per active sort to Value from DIVIDE and SUBTRACT operation above
        ii) NO:

I) DECREASE Maximum active tasks by 1

II) Return to C4

2) NO: Continue

K4. IF-THEN-ELSE test: Is there enough memory available below 16MB boundary line, and does sort work only below the 16MB line?

1) YES: Continue

2) NO:

a) Issue "Constrained by memory" message b) IF-THEN-ELSE test: Is Maximum number of tasks 1?

i) YES: Set Maximum memory per active sort to Value from DIVIDE and SUBTRACT operation above
        ii) NO:

I) DECREASE Maximum active tasks by 1
            II) Return to C4

K5. (RETURN)

APPENDIX L, RELOAD WITH CONCURRENT INDEXING ROUTINE (Called from MAIN (REORG PLUS)

L1. Start BUILD as a concurrent routine (builds indexes) and perform RELOAD I/O routine

L2. (RETURN)

APPENDIX M, BUILD ROUTINE (Called from RELOAD WITH CONCURRENT INDEXING routine)

(Build indexes (concurrently))

M1. Sort key/RID pairs (using SORT utility program)

M2. Read sorted key/RID pair from output of SORT routine

M3. Load key entry into index (according to DB2 standards)

M4. Repeat at M2 until no more keys

M5. (RETURN)

APPENDIX N, RELOAD I/O ROUTINE (Called from RELOAD WITH CONCURRENT INDEXING & BUILD routines)

N1. Initialize first space map

N2. Write first space map to database dataset at page 1

N3. Store page number of first page in current space map and in variable MAP#

N4. Initialize first data page in memory

N5. Load row into current data page in memory (according to DB2 standards)

N6. IF-THEN-ELSE test: Is page full?

1) YES:

a) Update space map entry in memory for this data page b) Write data page to database dataset on storage media c) IF-THE-ELSE test: Is space map full?

i) YES:

I) Write current space map to database dataset on storage media

II) Initialize next space map in memory, set MAP# to current page number ii) NO: Continue d) Repeat at N5 until no more rows 2) NO: Continue N7. Perform the SPACE MAP SHIFT routine

N8. (RETURN)

APPENDIX O, SPACE MAP SHIFT ROUTINE (Called from the RELOAD I/O routine)

O1. Make the last space map the current space map

O2. Temporarily read and store the previous space map

O3. Move the current space map into the location of the previous space map

O4. make the previous space map the current space map

O5. Loop to O2 until all space maps are moved

O6. (RETURN)

I claim:

1. A computer-implemented method of reorganizing a DB2 database comprising data organized into rows and stored in a row-data set, each said row having at least one index field containing an index-key value,
said computer-implemented method comprising the steps of:
(a) for each said row of data,
(1) retrieving said row of data from said row-data set; (2) obtaining a row identifier, referred to as a RID, for said row of data by simulating a process of storing said row of data to a table space;
(3) writing said row of data to an interim row-data set;
(4) for each said index field,
(A) determining the index-key value contained in the index field, and
(B) writing said index-key value for said row and the RID for said row to an interim index-data set corresponding to said index field;
(b) executing a plurality of processes in parallel to:
(1) retrieve said rows of data from said interim row-data set and write said rows of data to a row-data set; and
(2) retrieve said index-key values and said RIDs from said interim index-data set, sorting index-key value/RID pairs by index-key value, and writing an index-key value/RID pair to an index-data set.

* * * * *

UNITED STATES PATENT AND TRADEMARK OFFICE
CERTIFICATE OF CORRECTION

PATENT NO. : 5,222,235

DATED : June 22, 1993

INVENTOR(S) : Thomas E. Hintz and William R. Cunningham

It is certified that error appears in the above-identified patent and that said Letters Patent is hereby corrected as shown below:

Column 7, line 1, delete "heat", and insert --heart--

Column 8, line 55, delete "example", and insert --exemplar--

Column 13, line 26, delete "K3.1a", and insert --K3.1.b--

Signed and Sealed this

Ninth Day of November, 1993

*Attest:*

BRUCE LEHMAN

*Attesting Officer*  *Commissioner of Patents and Trademarks*